W. J. BOOTH.
WATER-CHECK FOR WATERING STOCK FROM PONDS, &c.
No. 172,695. Patented Jan. 25, 1876.
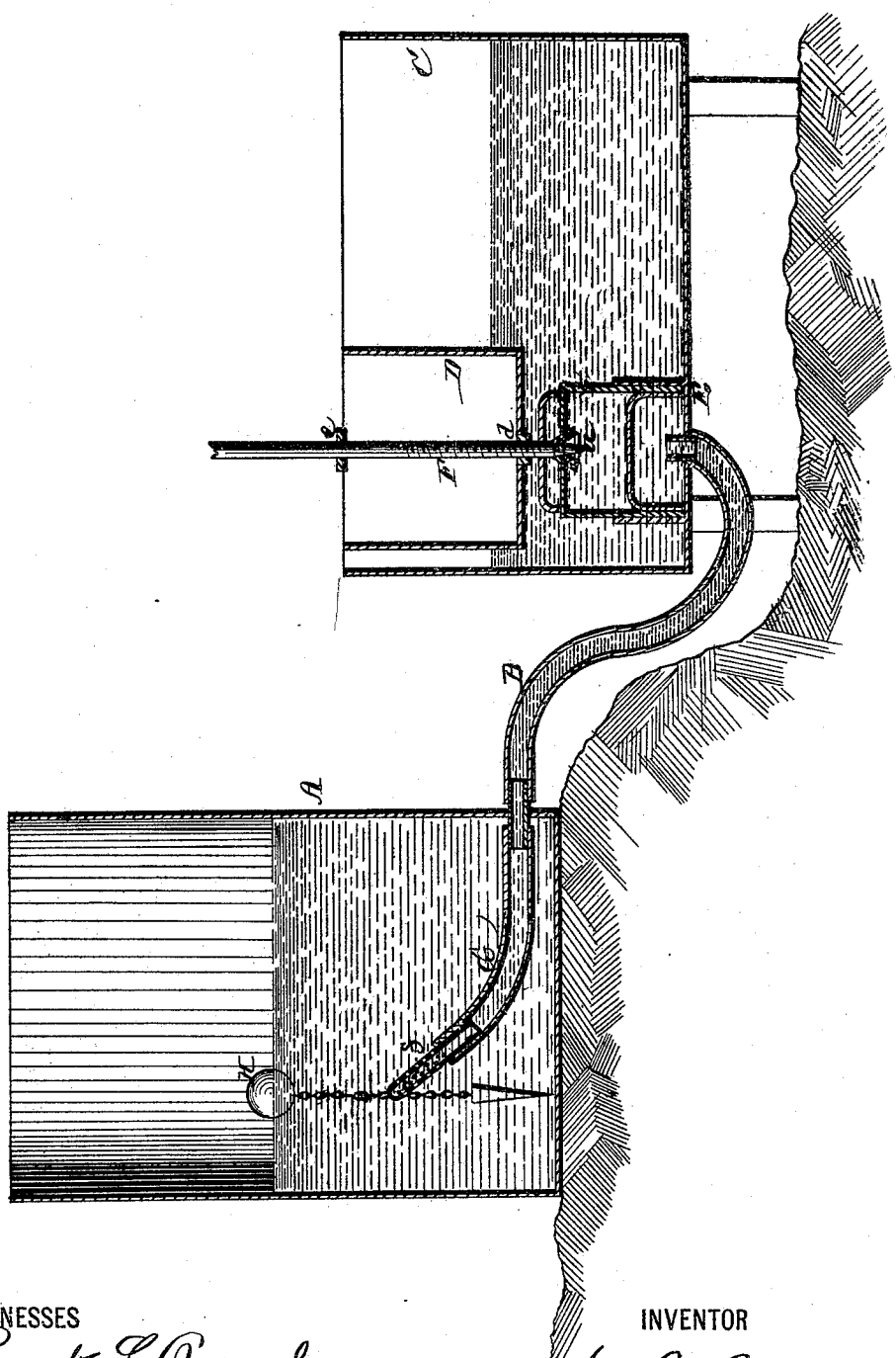
WITNESSES
INVENTOR

UNITED STATES PATENT OFFICE.

WILLIAM J. BOOTH, OF CENTRALIA, MISSOURI, ASSIGNOR OF ONE-HALF HIS RIGHT TO CLINTON E. KING.

IMPROVEMENT IN WATER-CHECKS FOR WATERING STOCK FROM PONDS, &c.

Specification forming part of Letters Patent No. 172,695, dated January 25, 1876; application filed August 18, 1874.

*To all whom it may concern:*

Be it known that I, WILLIAM JESSE BOOTH, of Centralia, in the county of Boone and in the State of Missouri, have invented certain new and useful Improvements in a Water-Check for Watering Stock from Ponds, and for other purposes; and do hereby declare that the following is a full, clear, and exact description thereof, reference being had to the accompanying drawings, and to the letters of reference marked thereon, making a part of this specification.

The nature of my invention consists in the construction of a water-trough and float and check-tank, arranged with a pipe and reservoir or pond, for making an automatic flow of water to the trough, as will be hereinafter described.

In the annexed figure, which represents a sectional view of my reservoir, tank, trough, and float, A is a reservoir or pond, the bottom of which is intended to be as high as the top of the trough out of which the cattle are to drink. The trough is, in other words, placed on lower ground than the pond which supplies the water. C represents the trough, through the bottom of which is conveyed the water from the pond by means of a suitable pipe buried beneath the ground. Before the water enters the trough proper it first passes through a check-tank, E, which, for summer use, may be located in the trough, but for winter use should be buried in the ground at some point between the pond and the trough. In this instance the check-tank is in the trough, as seen. D represents a float, made of any suitable size, which is placed in the trough and over the tank E. Passing through the float is a rod, F, which is provided a portion of its length with a screw-thread; and at its lower end, which projects into the check-tank, it has a valve secured to it, which serves to open or close a valve-opening in the top of the tank E by means of the thread on the rod F. The operating height of the float D may be regulated by working the rod up or down in the plate *d*. *a* is the valve, and *e* the guide-plate; and F, the stem or rod to which the valve is connected.

The water from the pond or reservoir flows into the trough until it is sufficiently high to raise the float D. When the float is raised a certain distance it carries with it the stem F, and the valve *a* on its lower end closes the opening in the check-tank, and thus causes the water to cease flowing.

The water in the trough is thus regulated either by the stem F or by weights, which may be placed in the float.

The check-tank and the trough should always be placed upon the same water-level.

At that end of the pipe B which connects the trough with the pond, and which is submerged in the pond, I provide a short pipe, G, which is closed at its receiving end, and there provided with a tubular sieve, *f*, which is suspended by the float H, and serves to strain the water entering the pipe G.

It will readily be seen that by this arrangement I make a cattle-trough which will always have a supply of water automatically when there is water in the pond, and that no water is wasted—only that being used which the cattle consume.

The pipes may be made of galvanized iron or other suitable material.

I do not broadly claim controlling the flow of water into a feed-trough from a tank or pond by means of an automatically-acting valve, as I am aware such is not new.

Having thus fully described my invention, what I claim as new, and desire to secure by Letters Patent, is—

The rod F, having its lower portion threaded, in combination with the guide *e*, plate *d*, float D, and check-tank E, for the purpose of regulating the height of water in the trough C, substantially as specified.

In testimony that I claim the foregoing I have hereunto set my hand this 3d day of August, 1874.

WILLIAM JESSE BOOTH.

Witnesses:
CLINTON E. KING,
R. E. HARRIS.